(12) United States Patent
Zaslavsky et al.

(10) Patent No.: US 9,098,699 B1
(45) Date of Patent: Aug. 4, 2015

(54) SMART TELEVISION DATA SHARING TO PROVIDE SECURITY

(71) Applicant: EMC Corporation, Hopkinton, MA (US)

(72) Inventors: Alex Zaslavsky, Petah Tikva (IL); Shachar Israeli, Hod Hasharon (IL); Yariv Amar, Ramla (IL)

(73) Assignee: EMC Corporation, Hopkinton, MA (US)

( * ) Notice: Subject to any disclaimer, the term of this patent is extended or adjusted under 35 U.S.C. 154(b) by 38 days.

(21) Appl. No.: 14/036,635

(22) Filed: Sep. 25, 2013

(51) Int. Cl.
*H04N 7/16* (2011.01)
*G06F 21/55* (2013.01)
*H04N 21/24* (2011.01)
*H04N 21/258* (2011.01)

(52) U.S. Cl.
CPC .............. *G06F 21/552* (2013.01); *H04N 21/24* (2013.01); *H04N 21/2585* (2013.01)

(58) Field of Classification Search
CPC .......... H04N 21/2541; H04N 21/2396; H04N 21/2585
See application file for complete search history.

(56) References Cited

U.S. PATENT DOCUMENTS

| | | | |
|---|---|---|---|
| 6,779,044 B1 * | 8/2004 | Katoh ................................ 710/5 |
| 8,201,257 B1 * | 6/2012 | Andres et al. ................... 726/25 |
| 2003/0056110 A1 * | 3/2003 | Kahn et al. ..................... 713/200 |
| 2004/0111611 A1 * | 6/2004 | Jin et al. ......................... 713/163 |
| 2004/0205345 A1 * | 10/2004 | Ripley et al. ................... 713/176 |
| 2005/0188423 A1 * | 8/2005 | Motsinger et al. ............... 726/22 |
| 2007/0061875 A1 * | 3/2007 | Le Buhan et al. ............... 726/10 |
| 2008/0072077 A1 * | 3/2008 | Orr ................................ 713/194 |
| 2008/0118231 A1 * | 5/2008 | Guzman et al. ................ 386/124 |
| 2008/0127312 A1 * | 5/2008 | Iwamoto et al. .................. 726/4 |
| 2009/0031144 A1 * | 1/2009 | Williams ....................... 713/193 |
| 2010/0131971 A1 * | 5/2010 | Hegglin et al. .................. 725/25 |
| 2011/0004893 A1 * | 1/2011 | Borislow et al. ................ 725/25 |
| 2011/0107436 A1 * | 5/2011 | Cholas et al. ................... 726/29 |
| 2011/0145597 A1 * | 6/2011 | Yamaguchi et al. ........... 713/189 |
| 2012/0047545 A1 * | 2/2012 | Sellers et al. .................. 725/111 |
| 2013/0061053 A1 * | 3/2013 | Yamaguchi et al. ........... 713/170 |

* cited by examiner

*Primary Examiner* — Pankaj Kumar
*Assistant Examiner* — Timothy Newlin
(74) *Attorney, Agent, or Firm* — BainwoodHuang

(57) ABSTRACT

A technique shares smart television data among subscribing organizations to provide security. The technique involves collecting, by an electronic server apparatus, data elements from multiple smart television devices. The technique further involves performing, by the electronic server apparatus, a set of risk analysis operations to generate risk scores corresponding to the multiple smart television devices. Each risk score (e.g., a numerical value) indicates an amount of risk (e.g., a probability) that a respective smart television device is malicious. The technique further involves providing, by the electronic server apparatus, an ordered list of the multiple smart television devices, the ordered list ranking the multiple television devices based on the risk scores. Information from the ordered list is well suited for use by an anti-fraud service in which subscriber organizations are informed of the information and use the information to identify and stop fraudulent activity in the future.

20 Claims, 5 Drawing Sheets

SMART TELEVISION DATA SHARING TO PROVIDE SECURITY

BACKGROUND

In general, a smart television (or smart TV) is a user platform which plays television shows as well as has Internet capabilities. Smart TVs are able to obtain television shows from antennae (i.e., broadcasts from television stations over the airwaves), cable channels, set-top boxes, satellite dishes, DVD players, VCR players, game consoles, and so on.

In some smart TV systems, the hardware which is equipped with Internet capabilities is integrated with the television hardware (e.g., within the television set). In other smart TV systems, the hardware which is equipped with Internet capabilities is tethered to the television set (e.g., in a set-top box, in a dongle form factor, as an attached appliance, etc.).

SUMMARY

Unfortunately, there are deficiencies to the above-described conventional smart TVs. In particular, smart TVs are susceptible to malicious software (or malware) since smart TVs typically run operating systems and additional software. Once the malware has infected a smart TV and compromised the smart TV, the smart TV is vulnerable in a manner similar to that of a computer which is infected with malware. For example, confidential information that is entered into a smart TV by a user can be captured and sent by the malware to hackers over the Internet without the user having any knowledge of the confidential information theft. Such confidential information can include credit card information, home or office address data, online purchase data, financial account data, and so on, since smart TV users may use their smart TVs to perform transactions (e.g., buy movies or products, banking, corporate activities, other e-commerce, etc.). Moreover, smart TV sensors such as voice and motion detectors, cameras, TV controller sensors, etc. can gather channel listings, recordings, viewing habits, images, and other personal information and other stored data from the compromised smart TV and then send that information to the hackers for unauthorized use.

Improved techniques are directed to sharing smart television data among subscribing organizations to provide security. Along these lines, the subscribing organizations collect data elements from smart television devices and incorporate this smart television information into a system which distributes anti-fraud data among the subscribing organizations thus enabling the subscribing organizations to proactively identify and thwart malicious activity. In particular, during normal operation, each subscribing organization collects data elements from its client devices which include smart television devices. Each subscribing organization then routinely shares data elements from smart television devices which are deemed malicious with a central server. The central server then shares this data along with other information (e.g., fraudulent profiles, patterns, behaviors, etc.) with the subscribing organizations to enable the subscribing organizations to stop fraudulent activity in the future.

One embodiment is directed to a method of providing security. The method includes collecting, by an electronic server apparatus, data elements from multiple smart television devices. The method further includes performing, by the electronic server apparatus, a set of risk analysis operations to generate risk scores corresponding to the multiple smart television devices. Each risk score indicates an amount of risk (e.g., a probability) that a respective smart television device is malicious. The method further includes providing, by the electronic server apparatus, an ordered list of the multiple smart television devices, the ordered list ranking the multiple television devices based on the risk scores. Such operation is well suited for use by an anti-fraud service such as the RSA eFraudNetwork service (eFN) provided by EMC Corporation of Hopkinton, Mass.

In some arrangements, performing the set of risk analysis operations includes generating, as the risk scores corresponding to the multiple smart television devices, numerical measures of malicious riskiness corresponding to the multiple smart television devices. These numerical measures are based on comparisons between (i) the data elements collected from the multiple smart television devices and (ii) data elements collected from smart television devices deemed to be involved in malicious activity.

In some arrangements, collecting the data elements from the multiple smart television devices includes gathering (i) a first set of data elements from a first smart television device which communicates with the electronic server apparatus through a first communications channel of a network, and (ii) a second set of data elements from a second smart television device which communicates with the electronic server apparatus through a second communications channel of the network. The first communications channel is separate from the second communications channel of the network.

In some arrangements, gathering includes obtaining, as at least part of the first set of data elements, a first manufacturer model number from the first smart television device, the first manufacturer model number identifying a model of the first smart television device among other models of smart television devices. In these arrangements, gathering further includes obtaining, as at least part of the second set of data elements, a second manufacturer model number from the second smart television device, the second manufacturer model number identifying a model of the second smart television device among the other models of smart television devices, the first manufacturer model number being different than the second manufacturer model number.

In some arrangements, gathering includes obtaining, as at least part of the first set of data elements, a first screen size from the first smart television device, the first screen size identifying a physical dimension of the first smart television device among other physical dimensions for smart television devices. In these arrangements, gathering further includes obtaining, as at least part of the second set of data elements, a second screen size from the second smart television device, the second screen size identifying a physical dimension of the second smart television device among the other physical dimensions for smart television devices, the first screen size being different than the second screen size.

In some arrangements, gathering includes obtaining, as at least part of the first set of data elements, a first geographical location from the first smart television device, the first geographical location identifying a geographical location of the first smart television device among other geographical locations. In these arrangements, gathering further includes obtaining, as at least part of the second set of data elements, a second geographical location from the second smart television device, the second geographical location identifying a geographical location of the second smart television device among the other geographical locations, the first geographical location being different than the second geographical location.

In some arrangements, gathering includes obtaining, as at least part of the first set of data elements, a first environmental setting from the first smart television device, the first environmental setting identifying an operating environment of the first smart television device among other operating environments. In these arrangements, gathering further includes obtaining, as at least part of the second set of data elements, a second environmental setting from the second smart television device, the second environmental setting identifying an operating environment of the second smart television device among the other operating environments, the first environmental setting being different than the second environmental setting.

In some arrangements, gathering includes obtaining, as at least part of the first set of data elements, a first smart television identifier from the first smart television device, the first smart television identifier uniquely identifying the first smart television device among other smart television devices. In these arrangements, gathering further includes obtaining, as at least part of the first set of data elements, a second smart television identifier from the second smart television device, the second smart television identifier uniquely identifying the second smart television device among other smart television devices, the first smart television identifier being different than the second smart television identifier.

In some arrangements, gathering includes obtaining, as at least part of the first set of data elements from the first smart television device, (i) a first manufacturer model number, (ii) a first screen size, (iii) a first geographical location, (iv) a first environmental setting, and (v) a first smart television identifier. In these arrangements, gathering further includes obtaining, as at least part of the second set of data elements from the second smart television device, (i) a second manufacturer model number, (ii) a second screen size, (iii) a second geographical location, (iv) a second environmental setting, and (v) a second smart television identifier, the first set of data elements being different than the second set of data elements.

In some arrangements, the method further includes providing a portion of the ordered list of the multiple smart television devices and the data elements collected from smart television devices on the portion of the ordered list to a central server.

In some arrangements, third-party institutions connect, as subscribers, to the central server to enable the central server to share smart television device data among the third-party institutions. In these arrangements, the method further includes receiving, from the central server, an update of data elements collected from smart television devices deemed to be involved in malicious activity.

In some arrangements, receiving the update includes acquiring, as at least some of the data elements collected from smart television devices deemed to be involved in malicious activity, data elements collected from smart television devices attempting to perform transactions with the third-party institutions.

It should be understood that some or all of the above-mentioned servers can be implemented in the cloud. In this cloud context, the electronic circuitry is formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in sharing smart TV data to provide security.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to sharing smart television (or smart TV) data among subscribing organizations to provide security. Along these lines, the subscribing organizations collect data elements from smart TV devices and incorporate this smart TV information into a system which distributes anti-fraud data among the subscribing organizations, thus enabling the subscribing organizations to proactively identify and prevent malicious activity. In particular, during normal operation, each subscribing organization collects data elements from its client devices which include smart TV devices. Each subscribing organization then routinely shares data elements from smart TV devices which are deemed malicious with a central server. The central server uses machine learning to score, rank (based on the scores) and identify smart TV devices which are involved in fraudulent activity. The central server then shares this data (e.g., fraudulent profiles, patterns, behaviors, etc.) with the subscribing organizations to enable the subscribing organizations to stop fraudulent activity in the future.

Figure 1:
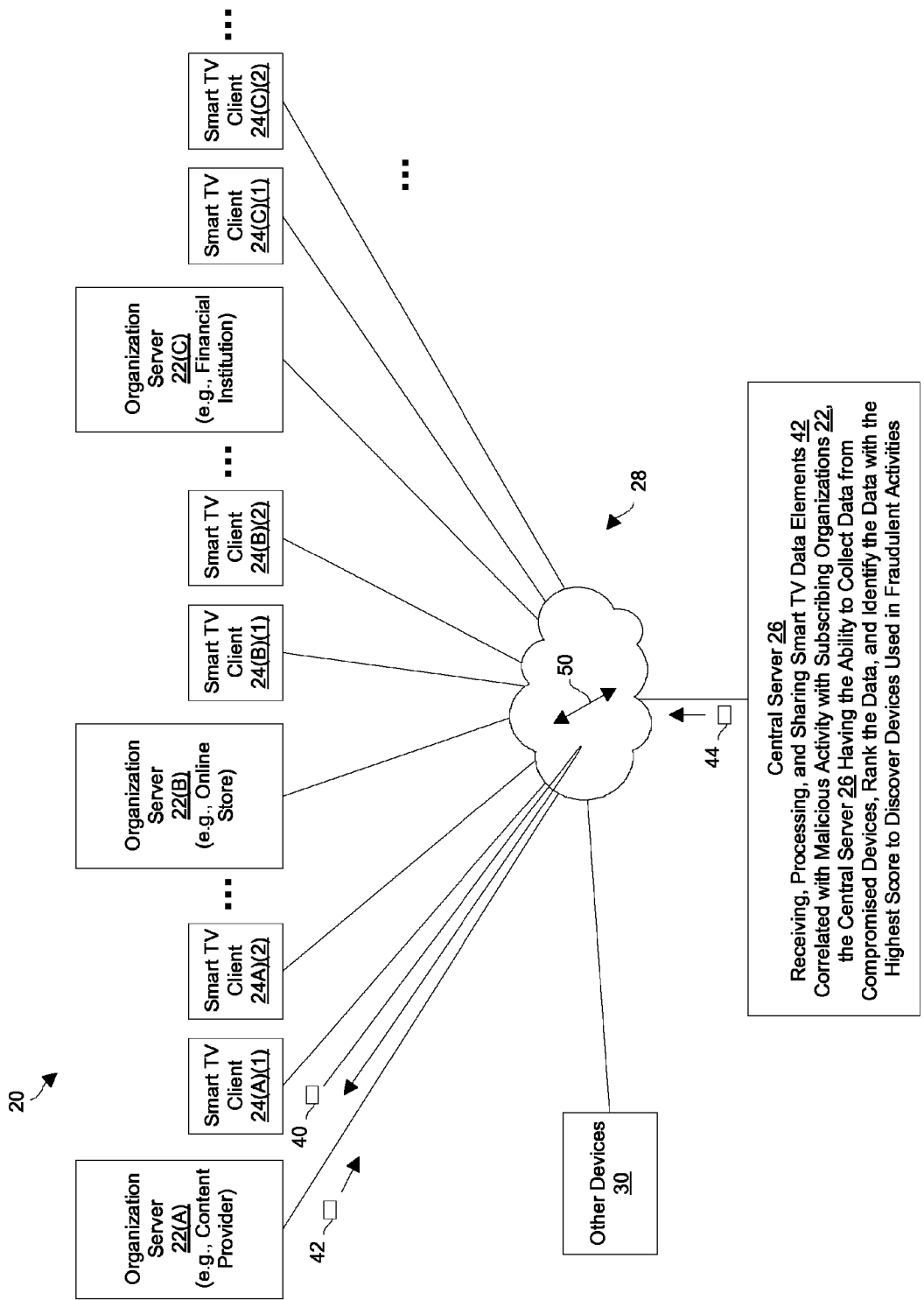
FIG. 1 is a block diagram of an electronic environment which is suitable for collecting and sharing smart television data among subscribing organizations to provide security.

FIG. 1 shows an electronic environment 20 which is suitable for collecting and sharing smart TV data among subscribing organizations to provide security. The electronic environment 20 includes organization servers 22(A), 22(B), 22(C), . . . (collectively, organization servers 22), smart TV client systems 24(A)(1), 24(A)(2), . . . , 24(B)(1), 24(B)(2), . . . , 24(C)(1), 24(C)(2), . . . (collectively, smart TV clients 24), a central server 26, and communications medium 28. The electronic environment 20 may include other devices 30 as well.

The organization servers 22 are constructed and arranged to provide various smart TV services to the smart TV clients 24 and perhaps to the other devices 30. For example, the organization server 22(A) can be a content provider such as a cable company selling packaged cable channels, an online movie store, a video game store, and so on, which provides content to the smart TV clients 24(A)(1), 24(A)(2), . . . . As another example, the organization server 22(B) can be an online store which sells products and services online to the smart TV clients 24(B)(1), 24(B)(2), . . . . As yet another example, the organization server 22(C) can be a financial institution such as bank or a brokerage to enable users of the smart TV clients 24(C)(1), 24(C)(2), . . . to perform financial transactions using their smart TV clients 24(C)(1), 24(C)(2), . . . .

The smart TV clients 24 are constructed and arranged to receive, on behalf of respective users, smart TV services from the organization servers 22. In particular, each smart TV client 24 is provisioned to render television shows from a variety of sources including broadcasts from television stations over the airwaves (e.g., via a TV antenna), cable channels, set-top boxes, satellite dishes, DVD players, VCR players, game consoles, home computers, and so on. Additionally, each smart TV client 24 is provisioned with Internet capabilities so that its respective users are able to perform transactions with the various organization servers 22 via the Internet. Such Internet capabilities can be obtained via computer network hardware which is integrated with the television hardware (e.g., within the same television chassis) or an add-on to a television set (e.g., an appliance tethered to a convention television).

Although there are associations shown between the smart TV clients 24 and the organization servers 22, it should be understood that each smart TV client 24 is capable of performing transactions with any organization server 22. For example, the smart TV client 24(A)(1) can perform transactions multiple organization servers 22 such as all of the organization servers 22(A), 22(B), 22(C), and so on.

During such activity, the organization servers 22 collect smart TV data elements 40 from the smart TV clients 24. Suitable smart TV data elements 40 include (if available) manufacturer model numbers of the smart TV client 24s, screen sizes of the smart TV client 24s, geographical locations of the smart TV client 24s, environmental settings of the smart TV client 24s (e.g., an office, a home, public, etc.), and smart television identifiers which uniquely identify the smart TV clients 24, among others. The organization servers 22 further send particular smart TV data elements 42 which are correlated with malicious activity to the central server 26.

The central server 26 is constructed and arranged to receive, process, and share data regarding the smart TV data elements 42 which are correlated with malicious activity among subscribing organizations 22. That is, the central server 26 obtains the smart TV data elements 42 which are correlated with malicious activity from the organizations 22 and consolidates this information into periodic smart TV information updates 44 for use by subscribing organization servers 22, i.e., organization servers 22 signed up with the central server 26. This processing involves taking the data elements 42 associated with particular smart TV clients 24 from the organization servers 22, using machine learning algorithms to generate scores for these smart TV clients 24, and ranking the smart TV clients 24 based on the scores. The smart TV clients 24 with the highest scores are considered devices used in fraudulent activity and included in the periodic smart TV information updates 44. Such smart TV information updates 44 (e.g., fraudulent profiles, patterns, behaviors, etc.) are then used by the subscribing organizations 22 to stop fraudulent activity in the future.

The communications medium 30 is constructed and arranged to connect the various components of the electronic environment 20 together to enable these components to exchange electronic signals 50 (e.g., see the double arrow 50). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting IP-based communications, cellular communications, cable-based communications, combinations thereof, etc. Further details will now be provided with reference to FIG. 2.

Figure 2:
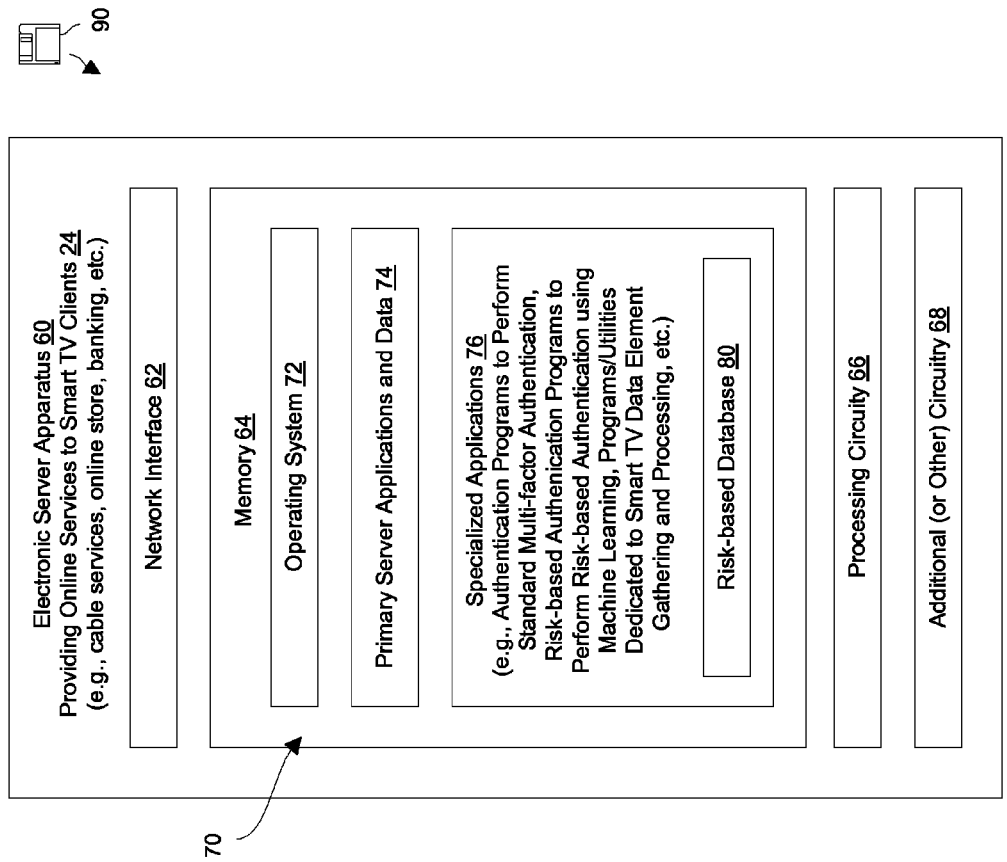
FIG. 2 is a block diagram of an electronic server apparatus of the electronic environment of FIG. 1.

FIG. 2 shows particular details of an electronic server apparatus 60 which is suitable for use as an organization server 22 of as the central server 26 (also see FIG. 1). In particular, in the context of an organization server 22, the electronic server apparatus 60 is equipped to (i) provide primary server services to smart TV clients 24 (to provide cable services, to operate as an online store, to perform financial transactions, etc.) and (ii) impose security utilizing smart TV data elements 40, 42 (FIG. 1). In the context of the central server 26, the electronic server apparatus 60 does not provide the primary server services to the smart TV clients 24 but nevertheless imposes security by evaluating the smart TV data elements 42 gathered by the organization servers 22 for fraudulent activity. The electronic server apparatus 60 includes a network interface 62, memory 64, and processing circuitry 66, and additional (or other) circuitry 68.

The network interface 62 is constructed and arranged to connect the electronic apparatus 60 to the communications medium 28 to enable communications with other components of the electronic environment 20 (also see FIG. 1). Such communications may be IP-based, cellular-based, cable-based, combinations thereof, and so on. Accordingly, the network interface 62 enables the electronic server apparatus 60 to communicate with smart TV clients 24 with Internet capabilities as well as other devices (e.g., the central server 26, other organization servers 22, the other devices 30, etc.).

The memory 64 is intended to represent both volatile storage (e.g., DRAM, SRAM, etc.) and non-volatile storage (e.g., flash memory, etc.). The memory 64 stores a variety of software constructs 70 including an operating system 72 to manage resources within the electronic server apparatus 60, primary server applications and data 74 to provide the primary services to the smart TV clients 24 as well as other apparatus (see other devices 30 in FIG. 1), and specialized applications 76 including a risk-based database 80 to utilize smart TV data elements 40 to provide security.

The processing circuitry 66 is constructed and arranged to operate in accordance with the various software constructs 70 stored in the memory 64. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 70 to the electronic server apparatus 60. The computer program product 90 has a non-transitory (or non-volatile) computer readable medium which stores a set of instructions which controls one or more operations of the electronic server apparatus 60. Examples of suitable computer readable storage media include tangible articles of manufacture and apparatus which store instructions in a non-volatile manner such as CD-ROM, flash memory, disk memory, tape memory, and the like.

The additional circuitry 68 represents other portions of the electronic server apparatus 60. For example, the electronic server apparatus 60 may include a user interface to enable a user such as an administrator to enter input and receive output (user I/O) to operate the electronic server apparatus 60. As another example, the electronic server apparatus 60 have enhanced hardware which is utilized when providing primary services, and so on.

During operation, in the context of an organization server 22, the electronic server apparatus 60 provides primary server services to various client devices via the Internet, i.e., through the communications medium 30 (FIG. 1). Such client devices include the smart TV clients 24 (FIG. 1). Such client devices may include other types of apparatus as well such as general purpose computers, laptops, tablet devices, smart phones, and so on (see other devices 30 in FIG. 1). For example, the electronic server apparatus 60 may be a content server which provides access to online movies, music, games, and so on. As another example, the electronic server apparatus 60 may be an online store which accepts web-based orders for products and services such as an online department store, an online furniture store, an online jewelry store, and so on. As yet another example, the electronic server apparatus 60 may be a financial institution which performs financial transactions such as online banking, online bill paying, brokerage transactions, credit card transactions, and so on. Other services are suitable as well such as package tracking, property monitoring and security, online travel services, other specialty services, and so on.

During such operation, the electronic server apparatus 60 collects smart TV data elements 40 from the smart TV clients 24. Such gathering of smart TV data elements 40 can occur while the electronic server apparatus 60 performs user authentication or simply in an ongoing manner in the background. In all situations, such collection and evaluation of smart TV data elements 40 enables improved discovery of compromised smart TV clients 24 (i.e., smart television devices which are susceptible to malware or that have already been infected) as well as purposefully malicious smart TV clients 24 (i.e., smart television devices which are operated by fraudsters, hackers, etc. to perform malicious activity).

In the context of user authentication, the electronic server apparatus 60 performs authentication operations to authenticate users of the client devices, i.e., to confirm that the users are legitimate rather than fraudsters, hackers or others involved in malicious activities. To this end, the electronic server apparatus 60 can perform risk-based (or adaptive) authentication in which the electronic server apparatus 60 collects a variety of smart TV data elements 40 such as:

- television manufacturer and television model data
- television screen size
- television location (e.g., country, state, city, street, zip code, etc.)
- television environment setting (e.g., office, home, public, etc.)
- unique television identifier As part of the collected smart TV data elements 40, other smart TV related and non-smart TV related parameters can be collected as well such as device-based authentication factors (e.g., cookies, IP-addresses, hardware parameters, browser capabilities and other software parameters, and so on). Additionally, as part of the collected smart TV data elements 40, other user-based authentication factors can be collected such as user biometrics (e.g., facial scans, retina scans, fingerprint scans, etc.), user behavior/habit information (e.g., typing speeds, user gestures, time of day information, etc.), and so on. Accordingly, in these arrangements, the smart TV data elements 40 provide additional dimensions for adaptive authentication.

The electronic server apparatus 60 correlates the collected smart TV data elements 40 with other smart TV data elements or smart TV profiles which are deemed to be associated with malicious activity (see the risk-based database 80 in FIG. 2) to generate risk scores, i.e., numerical measures of riskiness. Authentication attempts generating risk scores below a predefined threshold are deemed by the electronic server apparatus 60 to be successful and the users are considered to be legitimate. Accordingly, the electronic server apparatus 60 properly processes transactions on behalf of the successfully authenticated users.

However, authentication attempts generating risk scores above the predefined threshold are deemed by the electronic server apparatus 60 to be too risky and thus fail authentication. When authentication fails, the electronic server apparatus 60 performs some remedial activity such as step up authentication in which the users are challenged with a stronger form of authentication, sending alarms to an administrator, or even denying further access outright. If the electronic server apparatus 60 marks a particular transaction as fraudulent, the smart TV data elements 40 are saved for subsequent sharing with the central server 26 (e.g., see the smart TV data elements 42 in FIG. 1).

It should be understood that the electronic server apparatus 60 is capable of performing traditional multi-factor authentication rather than risk-based authentication. In standard multi-factor authentication, authentication factors obtained from the smart TV clients 24 such as usernames, passwords, personal identification numbers (PINs), one-time use passcodes (OTPs), etc. are simply compared to a variety of expected factors (i.e., the risk-based database 80 in FIG. 2). Furthermore, the authentication factors such as the smart TV data elements 40 can be compared to blacklist profiles in the risk-based database 80 and, if enough smart TV data elements 40 match those of a blacklist profile (e.g., more than 50%, more than 75%, etc.), authentication fails. Again, even using standard multi-factor authentication, if the electronic server apparatus 60 marks a particular transaction as fraudulent, the smart TV data elements 40 are saved for subsequent sharing with the central server 26.

Moreover, even if the electronic server apparatus 60 does not perform authentication, the electronic server apparatus 60 can still, in the background, collect smart TV data elements 40 from the smart TV clients 24 and compare them other smart TV data elements or smart TV profiles which are deemed to be associated with malicious activity to generate risk scores for each smart TV client 24. Such operation is suitable for use in the central server 26, as well as in intrusion protection systems (IPS) and intrusion detection systems (IDS). That is, as described above, the electronic server apparatus 60 uses machine learning to score smart TV clients 24, and then rank the smart TV clients 24 to identify smart TV clients 24 involved in fraudulent activity. Here, if the risk scores exceed a predefined threshold or the smart TV clients 24 with the highest risk scores (e.g., the top 10%, the top 100 smart TV clients 24, etc.), can be identified for remedial action by the electronic server apparatus 60 (e.g., flagged for further analysis, etc.). Furthermore, the electronic server apparatus 60 can mark particular smart TV clients 24 as suspicious and save the smart TV data elements 42 for these smart TV clients 24 for subsequent sharing with the central server 26.

As described above, the electronic server apparatus 60 uses smart TV data elements 40 to provide security. Additionally, the electronic server apparatus 60 routinely generates, based on the risk scores, an ordered list of smart TV clients 24 that the electronic server apparatus 60 has dealt with during a past period of operation. The electronic server apparatus 60 then provides at least a portion of this ordered list of smart TV clients 24 which were deemed malicious and the associated smart TV data elements 42 (e.g., the entire ordered list, the most risky X smart TV clients 24 on the ordered list where X is an integer or a percentage, etc.) to the central server 26 (see smart TV data elements 42 in FIG. 1). Other deployed electronic server apparatus 60 operate in a similar manner with such processing occurring periodically such as weekly, nightly or even hourly.

The smart TV data elements 42 which were deemed associated with malicious activity from all of the electronic server apparatus 60 (see the organization servers 22 in FIG. 1). In particular, the central server 26 applies analytics to the smart TV data elements 42 (e.g., consumes as input during a machine learning phase, etc.) to generate updates 44 for distribution to subscribing organization servers 22. The updates 44 may include the raw smart TV data elements 42, the riskiest sets of raw smart TV data elements 42, smart TV profiles, smart TV patterns, smart TV behaviors, combinations thereof, and so on. The central server 26 sends the updates 44 to the subscribing organization servers 22 for improved secure operation in the future. The subscribing organization servers 22 then update their risk-based databases 80 to enable improved detection of malicious smart TV clients 24 in the future. Further details will now be provided with reference to FIGS. 3 and 4.

Figure 3:
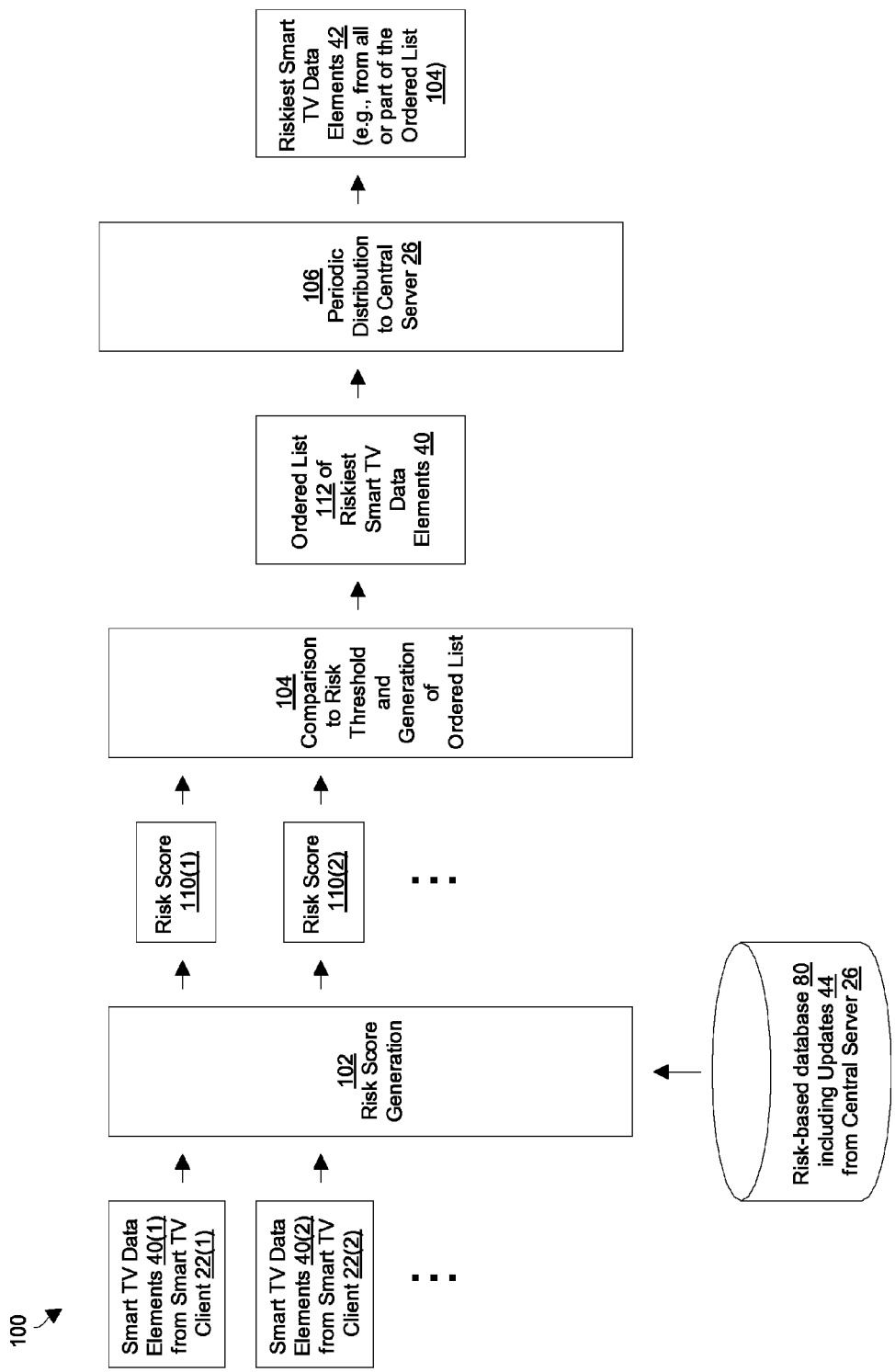
FIG. 3 is a block diagram illustrating particular operations of the electronic server apparatus of FIG. 2.
Figure 4:
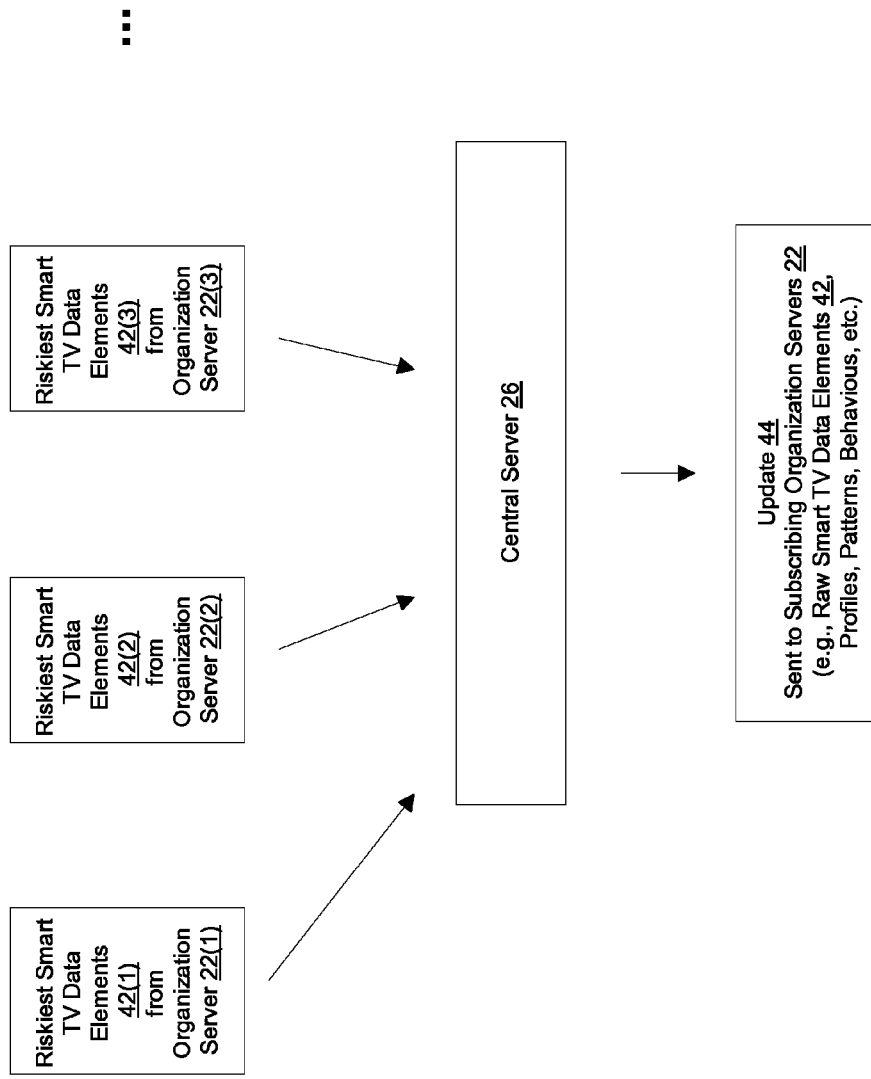
FIG. 4 is a flowchart of a procedure which is performed by the electronic server apparatus of FIG. 2.

FIGS. 3 and 4 show details of the information flow with respect to the organization servers 22 and the central server 26 (also see FIG. 1). In particular, FIG. 3 shows details of how an organization server 22 collects smart TV data elements 40 from the smart TV clients 24 and share information with the central server 26. FIG. 4 shows the central server 26 collecting the information from the organization servers 22, and then processing and sharing this information among subscribing organization servers 22.

With reference to FIG. 3, each organization server 22 is capable of processing smart TV data elements 40 using a flow 100 which includes multiple stages 102, 104, 106 arranged in a pipelined manner. In particular, the stage 102 receives smart TV data elements 40(1), 40(2), . . . from respective smart TV clients 24(1), 24(2), . . . during the normal course of operation of providing services to smart TV clients 24 (also see FIG. 1) (e.g., during authentication, to complete transactions, etc.). The stage 102 then utilizes information from a risk-based database 80 (also see FIG. 2) to generate risk scores 110(1), 110(2), . . . from the smart TV data elements 40(1), 40(2), . . . . As mentioned earlier, the risk-based database 80 includes updates 44 which were earlier-received from the central server 26. Accordingly, the stage 102 can apply machine learning methodology and analytics to derive a risk score for each smart TV client 24 or authentication event in order to identify the most suspect smart TV data elements 40.

Next, the stage 104 compares the risk scores 110(1), 110(2), . . . to a predefined threshold and includes the results in an ordered list 112. In particular, the risk scores 110(1), 110(2), . . . may be used specifically to evaluate riskiness of the smart TV clients 24(1), 24(2), . . . or additionally for user authentication. The ordered list 112 ranks the smart TV data elements 40 in order of riskiness based on risk scores. That is, the smart TV data elements 40 at the top of the list are associated with a smart TV client 24 that is most suspicious and deemed most malicious. The smart TV data elements 40 next from the top of the list are associated with a smart TV client 24 that is the next most suspicious and deemed the next most malicious, and so on. Accordingly, the smart TV data elements 40 in the ordered list belong to those smart TV clients 24 that were the most problematic, i.e., rejected due to having the highest risk scores, deemed most malicious, and so on.

Next, the stage 106 periodically certain smart TV data elements 42 to the central server 26. That is, the organization server 22 sends all or part of the ordered list 112 to the central server 26. Such a transfer of the smart TV data elements 42 deemed to be associated with malicious activity may occur periodically, e.g., monthly, weekly, daily, hourly, etc.

With reference to FIG. 4, the central server 26 receives the transfer of smart TV data elements 42 deemed to be associated with malicious activity from each organization server 22. The central server 26 then aggregates the smart TV data elements 42 into the updates 44, and sends the updates 44 (e.g., as a unified feed) to the subscribing organization servers 22 for use in providing security in the future. Such distribution may occur based on a schedule, e.g., hourly, daily, weekly, etc. It should be understood that such aggregation may involve consolidating the smart TV data, application of machine learning and analytics, and so on.

For example, from the received transfers from the organization servers 22, the central server 26 may conclude that smart TV clients 24 made by a certain manufacturer or running a certain operating system may be highly susceptible to particular malware and thus configure the update 44 to associate higher riskiness with those smart TV clients 24. As another example, the central server 26 may conclude that smart TV clients 24 having a certain screen size or located in a certain geographical location have a higher likelihood of being malicious (perhaps operated by hackers) and thus configure the update 44 to associate higher riskiness with those smart TV clients 24, and so on. Further details will now be provided with reference to FIG. 5.

Figure 5:
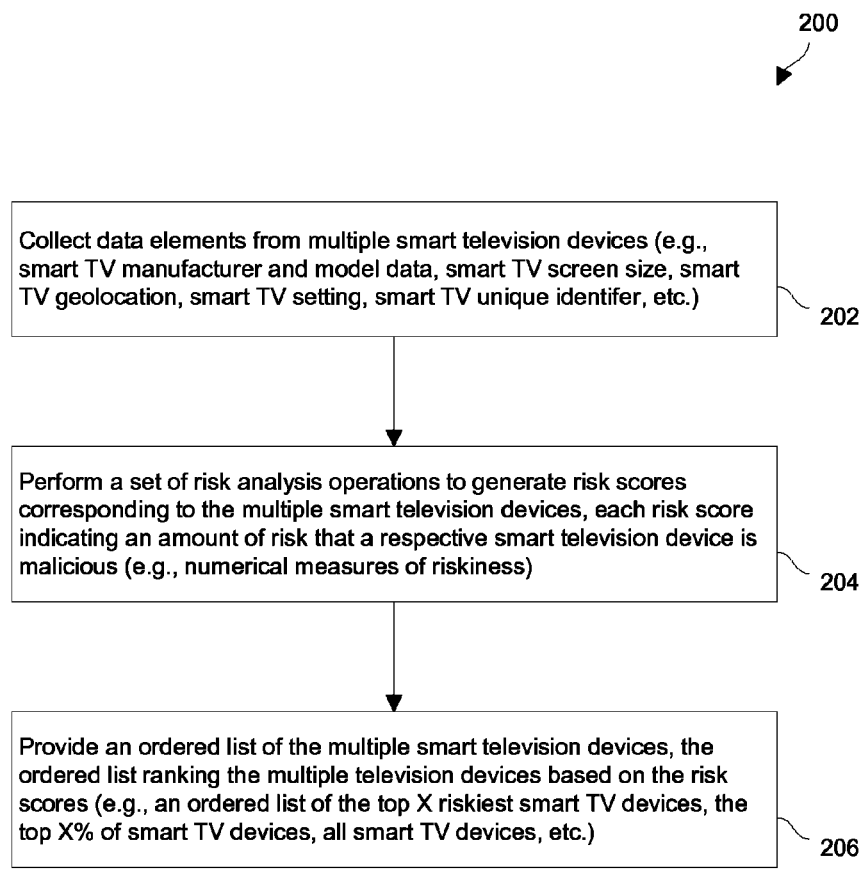
FIG. 5 is a block diagram illustrating particular operations of the electronic environment of FIG. 1.

FIG. 5 shows a flowchart of a procedure 200 to provide security. The procedure 200 is performed by each organization server 22 or by the central server 26, of the electronic environment 20 of FIG. 1, or by both (also see the electronic server apparatus 60 in FIG. 2).

In step 202, the electronic server apparatus 60 collects data elements from multiple smart television devices (see the smart TV clients 24). Such data elements may be obtained while users of the smart television devices gather authentication factors for user authentication or simply in the background (e.g., as part of an IPS or IDS). Additionally, examples of such data elements include smart television manufacturer and model data, television screen size, geolocation, setting (e.g., office, home, public, etc.), unique IDs, and so on.

In step 204, the electronic server apparatus 60 performs a set of risk analysis operations to generate risk scores corresponding to the multiple smart television devices (also see FIG. 3). Each risk score indicates an amount of risk that a respective smart television device is malicious (e.g., a numerical measure of risk).

In step 206, the electronic server apparatus 60 provides an ordered list of the multiple smart television devices. The ordered list ranks the multiple television devices based on the risk scores. In some arrangements, the ordered list includes only the top X smart television devices based on risk score (X being an integer such as 10, 25, 50, etc.). In other arrangements, the ordered list includes only the top X % of smart television devices based on risk score (e.g., the top 5%, the top 10%, etc.), and so on. The organization server 22 is then able to share all or part of the ordered list with a central server which then distributes centralized information to subscribers to provide security in the future.

As described above, improved techniques are directed to sharing smart television data among subscribing organizations 22 to provide security. That is, the subscribing organizations 22 collect data elements 40 from smart television devices 24 and incorporate this smart television information into a system which distributes anti-fraud data among the subscribing organizations 22 thus enabling the subscribing organizations 22 to proactively identify and thwart malicious activity. In particular, during normal operation, each subscribing organization collects data elements 40 from its client devices which include smart television devices 24. Next, each subscribing organization 22 routinely shares data elements 42 from smart television devices 24 which are deemed malicious with a central server 26. The central server 26 uses machine learning to score, rank (based on the scores) and identify smart television devices 24 which are involved in fraudulent activity. The central server 26 then distributes this data along with other information (e.g., fraudulent profiles, patterns, behaviors, etc.) with the subscribing organizations 22 to enable the subscribing organizations 22 to stop fraudulent activity in the future.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that in some arrangements the calculations based on the smart TV data elements 40 can occur in real time or near real time to detect compromised devices and quickly stop fraudulent activity and minimize fraud losses. Such modifications and enhancements are intended to belong to various embodiments of the disclosure.

What is claimed is:

1. A method of providing security, the method comprising:
    collecting, by an electronic server apparatus, data elements from multiple smart television devices;
    performing, by the electronic server apparatus, a set of risk analysis operations to generate risk scores corresponding to the multiple smart television devices, each risk score indicating an amount of risk that a respective smart television device is malicious; and
    providing, by the electronic server apparatus, an ordered list of the multiple smart television devices, the ordered list ranking the multiple television devices based on the risk scores;
    wherein collecting includes:
        obtaining, as at least part of a first set of data elements from a first smart television device, a first screen size identifying a physical dimension of a first smart television device among other physical dimensions for smart television devices, and
        obtaining, as at least part of a second set of data elements from a second smart television device, a second screen size identifying a physical dimension of the second smart television device among the other physical dimensions for smart television devices, the first screen size being different than the second screen size.

2. A method as in claim 1 wherein performing the set of risk analysis operations includes:
    generating, as the risk scores corresponding to the multiple smart television devices, numerical measures of malicious riskiness corresponding to the multiple smart television devices based on comparisons between (i) the data elements collected from the multiple smart television devices and (ii) data elements collected from smart television devices deemed to be involved in malicious activity.

3. A method as in claim 2 wherein the first smart television device communicates with the electronic server apparatus through a first communications channel of a network, and the second smart television device communicates with the electronic server apparatus through a second communications channel of the network which is separate from the first communications channel of the network.

4. A method as in claim 3 wherein collecting further includes:
    obtaining, as at least part of the first set of data elements, a first manufacturer model number from the first smart television device, the first manufacturer model number identifying a model of the first smart television device among other models of smart television devices, and
    obtaining, as at least part of the second set of data elements, a second manufacturer model number from the second smart television device, the second manufacturer model number identifying a model of the second smart television device among the other models of smart television devices, the first manufacturer model number being different than the second manufacturer model number.

5. A method as in claim 3 wherein collecting further includes:
    obtaining, as at least part of the first set of data elements, a first geographical location from the first smart television device, the first geographical location identifying a geographical location of the first smart television device among other geographical locations, and
    obtaining, as at least part of the second set of data elements, a second geographical location from the second smart television device, the second geographical location identifying a geographical location of the second smart television device among the other geographical locations, the first geographical location being different than the second geographical location.

6. A method as in claim 3 wherein collecting further includes:
    obtaining, as at least part of the first set of data elements, a first environmental setting from the first smart television device, the first environmental setting identifying an operating environment of the first smart television device among other operating environments, and
    obtaining, as at least part of the second set of data elements, a second environmental setting from the second smart television device, the second environmental setting identifying an operating environment of the second smart television device among the other operating environments, the first environmental setting being different than the second environmental setting.

7. A method as in claim 3 wherein collecting further includes:
    obtaining, as at least part of the first set of data elements, a first smart television identifier from the first smart television device, the first smart television identifier uniquely identifying the first smart television device among other smart television devices, and
    obtaining, as at least part of the first set of data elements, a second smart television identifier from the second smart television device, the second smart television identifier uniquely identifying the second smart television device among other smart television devices, the first smart television identifier being different than the second smart television identifier.

8. A method as in claim 3 wherein collecting further includes:

obtaining, as at least part of the first set of data elements from the first smart television device, (i) a first manufacturer model number, (ii) a first geographical location, (iii) a first environmental setting, and (iv) a first smart television identifier, and obtaining, as at least part of the second set of data elements from the second smart television device, (i) a second manufacturer model number, (ii) a second geographical location, (iii) a second environmental setting, and (iv) a second smart television identifier, the first set of data elements being different than the second set of data elements.

9. A method as in claim 2, further comprising:

providing a portion of the ordered list of the multiple smart television devices and the data elements collected from smart television devices on the portion of the ordered list to a central server.

10. A method of providing security, the method comprising:

collecting, by an electronic server apparatus, data elements from multiple smart television devices;

performing, by the electronic server apparatus, a set of risk analysis operations to generate risk scores corresponding to the multiple smart television devices, each risk score indicating an amount of risk that a respective smart television device is malicious; and providing, by the electronic server apparatus, an ordered list of the multiple smart television devices, the ordered list ranking the multiple television devices based on the risk scores;

wherein third-party institutions connect, as subscribers, to a central server to enable the central server to share smart television device data among the third-party institutions; and wherein the method further comprises:

receiving, from the central server, an update of data elements collected from smart television devices deemed to be involved in malicious activity.

11. A method as in claim 10 wherein collecting the data elements includes:

obtaining, as at least part of a first set of data elements from a first smart television device, a first screen size identifying a physical dimension of a first smart television device among other physical dimensions for smart television devices, and obtaining, as at least part of a second set of data elements from a second smart television device, a second screen size identifying a physical dimension of the second smart television device among the other physical dimensions for smart television devices, the first screen size being different than the second screen size.

12. A method as in claim 10 wherein receiving the update includes:

receiving, as at least some of the data elements collected from smart television devices deemed to be involved in malicious activity, data elements collected from smart television devices attempting to perform transactions with the third-party institutions.

13. An electronic server apparatus, comprising:

a network interface to connect to a network;

memory; and control circuitry coupled to the network interface and the memory, the memory storing instructions which, when carried out by the control circuitry, cause the control circuitry to:

collect data elements from multiple smart television devices through the network interface, perform a set of risk analysis operations to generate risk scores corresponding to the multiple smart television devices, each risk score indicating an amount of risk that a respective smart television device is malicious, and provide an ordered list of the multiple smart television devices, the ordered list ranking the multiple television devices based on the risk scores; and wherein the control circuitry, when collecting the data elements, is constructed and arranged to:

obtain, as at least part of a first set of data elements from a first smart television device, a first screen size identifying a physical dimension of a first smart television device among other physical dimensions for smart television devices, and obtain, as at least part of a second set of data elements from a second smart television device, a second screen size identifying a physical dimension of the second smart television device among the other physical dimensions for smart television devices, the first screen size being different than the second screen size.

14. An electronic server apparatus as in claim 13 wherein the control circuitry, when performing the set of risk analysis operations, is constructed and arranged to:

generate, as the risk scores corresponding to the multiple smart television devices, numerical measures of malicious riskiness corresponding to the multiple smart television devices based on comparisons between (i) the data elements collected from the multiple smart television devices and (ii) data elements collected from smart television devices deemed to be involved in malicious activity.

15. An electronic server apparatus as in claim 14 wherein the control circuitry, when collecting the data elements from the multiple smart television devices, is constructed and arranged to:

gather (i) the first set of data elements from the first smart television device through the network and the network interface, and (ii) the second set of data elements from the second smart television device through the network and the network interface, the first set of data elements being different than the second set of data elements.

16. An electronic server apparatus, comprising:

a network interface to connect to a network;

memory; and control circuitry coupled to the network interface and the memory, the memory storing instructions which, when carried out by the control circuitry, cause the control circuitry to:

collect data elements from multiple smart television devices through the network interface, perform a set of risk analysis operations to generate risk scores corresponding to the multiple smart television devices, each risk score indicating an amount of risk that a respective smart television device is malicious, and provide an ordered list of the multiple smart television devices, the ordered list ranking the multiple television devices based on the risk scores;

wherein third-party institutions connect, as subscribers, to a central server to enable the central server to share data describing smart television devices deemed to be involved in malicious activity among the third-party institutions; and wherein the instructions stored in the memory further cause the control circuitry to:

provide a portion of the ordered list of the multiple smart television devices and the data elements collected from smart television devices on the portion of the ordered list to the central server, and receive, from the central server, new data elements collected from smart television devices that (i) attempted to perform transactions with the third-party institutions and (ii) are deemed to be involved in malicious activity.

17. An electronic server apparatus as in claim 16 wherein the control circuitry, when collecting the data elements, is constructed and arranged to:

obtain, as at least part of a first set of data elements from a first smart television device, a first screen size identifying a physical dimension of a first smart television device among other physical dimensions for smart television devices, and obtain, as at least part of a second set of data elements from a second smart television device, a second screen size identifying a physical dimension of the second smart television device among the other physical dimensions for smart television devices, the first screen size being different than the second screen size.

18. A computer program product having a non-transitory computer readable medium which stores a set of instructions to provide security, the set of instructions, when carried out by computerized circuitry, causing the computerized circuitry to perform a method of:

collecting, by the computerized circuitry, data elements from multiple smart television devices;

performing, by the computerized circuitry, a set of risk analysis operations to generate risk scores corresponding to the multiple smart television devices, each risk score indicating an amount of risk that a respective smart television device is malicious; and providing, by the computerized circuitry, an ordered list of the multiple smart television devices, the ordered list ranking the multiple television devices based on the risk scores;

wherein collecting includes:

obtaining, as at least part of a first set of data elements from a first smart television device, a first screen size identifying a physical dimension of a first smart television device among other physical dimensions for smart television devices, and obtaining, as at least part of a second set of data elements from a second smart television device, a second screen size identifying a physical dimension of the second smart television device among the other physical dimensions for smart television devices, the first screen size being different than the second screen size.

19. A computer program product as in claim 18 wherein performing the set of risk analysis operations includes:

generating, as the risk scores corresponding to the multiple smart television devices, numerical measures of malicious riskiness corresponding to the multiple smart television devices based on comparisons between (i) the data elements collected from the multiple smart television devices and (ii) data elements collected from smart television devices deemed to be involved in malicious activity.

20. A computer program product having a non-transitory computer readable medium which stores a set of instructions to provide security, the set of instructions, when carried out by computerized circuitry, causing the computerized circuitry to perform a method of:

collecting, by the computerized circuitry, data elements from multiple smart television devices;

performing, by the computerized circuitry, a set of risk analysis operations to generate risk scores corresponding to the multiple smart television devices, each risk score indicating an amount of risk that a respective smart television device is malicious; and providing, by the computerized circuitry, an ordered list of the multiple smart television devices, the ordered list ranking the multiple television devices based on the risk scores;

wherein third-party institutions connect, as subscribers, to a central server to enable the central server to share smart television device data among the third-party institutions; and wherein the method further comprises:

receiving, from the central server and by the computerized circuitry, an update of data elements collected from smart television devices deemed to be involved in malicious activity.

* * * * *